United States Patent
Anvekar et al.

(10) Patent No.: US 6,377,805 B1
(45) Date of Patent: Apr. 23, 2002

(54) MAINTAINING DATA COMMUNICATION THROUGH NEIGHBORING MOBILE UNITS DURING HANDOFF

(75) Inventors: Dinesh Kashinath Anvekar, New Delhi; Manpreet Singh Dang; Amol Prakash, both of Delhi; Rajeev Shorey, New Delhi, all of (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,120

(22) Filed: Aug. 4, 1999

(51) Int. Cl.[7] ............................................... H04Q 7/20
(52) U.S. Cl. ...................... 455/436; 455/440; 455/11.1
(58) Field of Search ................................. 455/436, 437, 455/438, 439, 11.1, 500, 507, 440; 370/331, 332, 335

(56) References Cited

U.S. PATENT DOCUMENTS

| | | | |
|---|---|---|---|
| 5,042,082 A | | 8/1991 | Dahlin |
| 5,175,867 A | | 12/1992 | Wejke et al. |
| 5,200,957 A | | 4/1993 | Dahlin |
| 5,222,248 A | | 6/1993 | McDonald et al. |
| 5,309,503 A | * | 5/1994 | Bruckert et al. ............ 455/436 |
| 5,481,539 A | * | 1/1996 | Hershey et al. ............ 455/11.1 |
| 5,483,668 A | | 1/1996 | Malkamaki et al. |
| 5,634,192 A | | 5/1997 | Meche et al. |
| 5,640,679 A | | 6/1997 | Lundqvist et al. |
| 5,959,981 A | * | 9/1999 | Bruckert et al. ............ 370/331 |
| 6,075,989 A | * | 6/2000 | Moore et al. ............... 455/436 |

FOREIGN PATENT DOCUMENTS

WO    WO 00/59160    10/2000

* cited by examiner

*Primary Examiner*—Nay Maung
*Assistant Examiner*—Quochien B. Vuong
(74) *Attorney, Agent, or Firm*—Whitham, Curtis & Christofferson, P.C.; Stephen C. Kaufman

(57) ABSTRACT

A data communication for a handoff mobile unit is maintained by data forwarding through neighboring mobile units in indoor wireless cellular communication networks operates such that, when the master unit has no available channels, the mobile unit switches over to master status to create an ad hoc cell. The mobile unit then pages neighboring slave mobile units for data forwarding assistance. The mobile unit chooses one or more slave mobile units and establishes wireless links with the chosen slave mobile units. These chosen mobile units then have two masters; one the master unit of the cell and the other the handoff mobile unit which has created the ad hoc cell. A list of the slave mobile units in the ad hoc cell is sent to the network server, and data communication proceeds with data forwarding through the chosen mobile slave units. When a channel becomes available with the master unit for the cell, the handoff mobile unit becomes a slave mobile unit to the master unit and the ad hoc cell is dissolved.

20 Claims, 13 Drawing Sheets

MAINTAINING DATA COMMUNICATION THROUGH NEIGHBORING MOBILE UNITS DURING HANDOFF

BACKGROUND OF THE INVENTION

1. Field of the Invention

The present invention generally relates to packet data wireless communications systems and, more particularly, to continuing packet data communications through one or more neighboring mobile units until a new connection is established in the new cell.

2. Background Description

With the advent of in-building packet data wireless data communication standards, portable personal computing devices such as laptop computers, PDAs (Personal Digital Assistants), palmtop computers, and the like will be used to access data through wireless communication links. In such systems, while wireless links eliminate cables and provide tetherless access, full mobility across the wireless network coverage area is dependent on) the ability of the systems to provide seamless handoffs between access points. However, in practical systems, the number of mobile units (slaves) that can be actively connected to a base station or an access point (master) of a cell is limited to a certain number dependent on the system. For example, in one standard, a maximum of seven slaves can be actively linked to a single master at any time. Therefore, when a mobile unit moves to a new cell, it could experience indefinite interruption in communication if the new base station is already busy with all the allowed maximum number of connections. But in practice, it is desirable to maintain communication for the handoff mobile unit even though at a reduced data transfer rate.

Handoff methods which involve the assistance of mobile units have been proposed. See for example U.S. Pat. No. 5,042,082 to Dahlin for "Mobile Assisted Handoff", U.S. Pat. No. 5,634,192 to Meche et al. for "Mobile-Assisted Handoff Technique", and U.S. Pat. No. 5,200,957 to Dahlin for "Mobile Assisted Handoff". The role of mobile units in such handoff methods is mainly to provide to base station(s) information such as received power levels and candidate base stations for handoff.

Handoff schemes such as that proposed in U.S. Pat. No. 5,175,867 to Wejke et al. for "Neighbor-Assisted Handoff in a Cellular Communication System" involve the participation of neighboring base stations. U.S. Pat. No. 5,640,679 to Lundqvist et al. for "Method and Apparatus for Handing Off Mobile Station From a First to a Second Channel in a Mobile Communication System" describes a procedure for handing off a mobile unit in a time division multiplex (TDM) channel sharing system wherein a time offset to be used in the new cell is determined before the handoff is effected.

One of the goals of handoff techniques is to provide handoff without interruption in communication. Keeping this in mind, some methods, such as that presented in U.S. Pat. No. 5,483,668 to Malkamaki et al. for "Method and Apparatus Providing Handoff of a Mobile Station Between Base Stations Using Parallel Communication Links Established with Different Time Slots", establish parallel communication links with the next base station to which a handoff is expected.

While existing handoff schemes perform well if the next base station has free channel resources, there is still a need to address the problem of handoff to a busy base station. In a situation wherein all the neighboring base stations are busy to their full capacity, and if a mobile unit moves to one of the busy cells, it has to wait until channel resources become available in the new cell. During this indefinite waiting period, it is desirable to provide data communication to the mobile unit through alternative means.

SUMMARY OF THE INVENTION

It is therefore an object of the present invention to provide continuing data communication during handoff waiting periods by utilizing neighboring mobile units, if any, to forward data packets destined for the handoff mobile unit.

It is another object of the invention to maintain communication for a handoff mobile unit even though at a reduced data transfer rate.

According to the invention, communication for a handoff mobile unit is maintained even when the master unit has no available channels. In this case, the mobile unit switches over to master status to create an ad hoc cell. The mobile unit then pages neighboring slave mobile units for data forwarding assistance. The mobile unit chooses one or more slave mobile units and establishes wireless links with the chosen slave mobile units. These chosen mobile units then have two masters; one the master unit of the cell and the other the handoff mobile unit which has created the ad hoc cell. A list of the slave mobile units in the ad hoc cell is sent to the network server, and data communication proceeds with data forwarding through the chosen mobile slave units. When a channel becomes available with the master unit for the cell, the handoff mobile unit becomes a slave mobile unit to the master unit and the ad hoc cell is dissolved.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
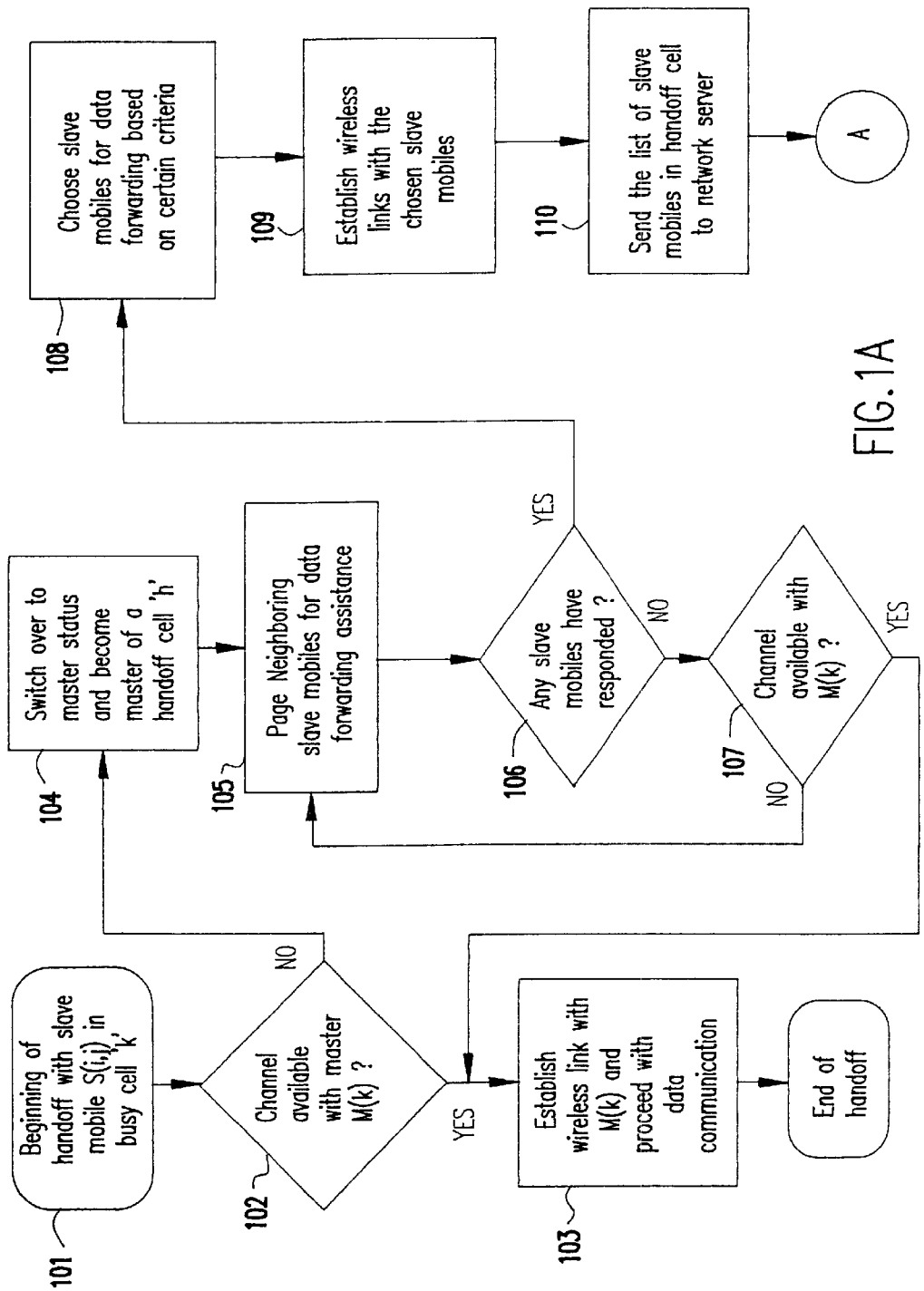
FIGS. 1A and 1B, taken together, are a flow chart for the handoff communication method according to the invention.
Figure 1B:
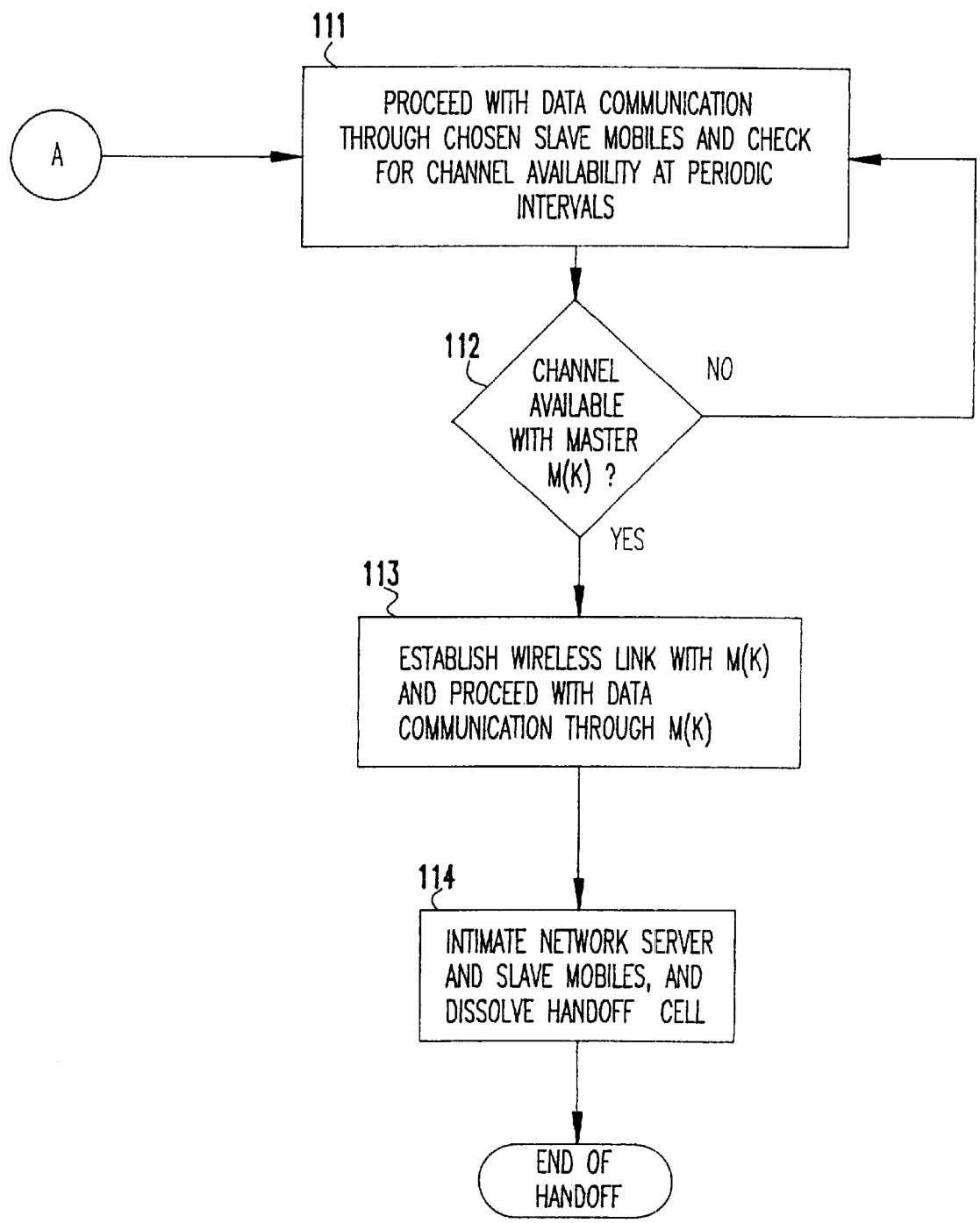
Figure 2:
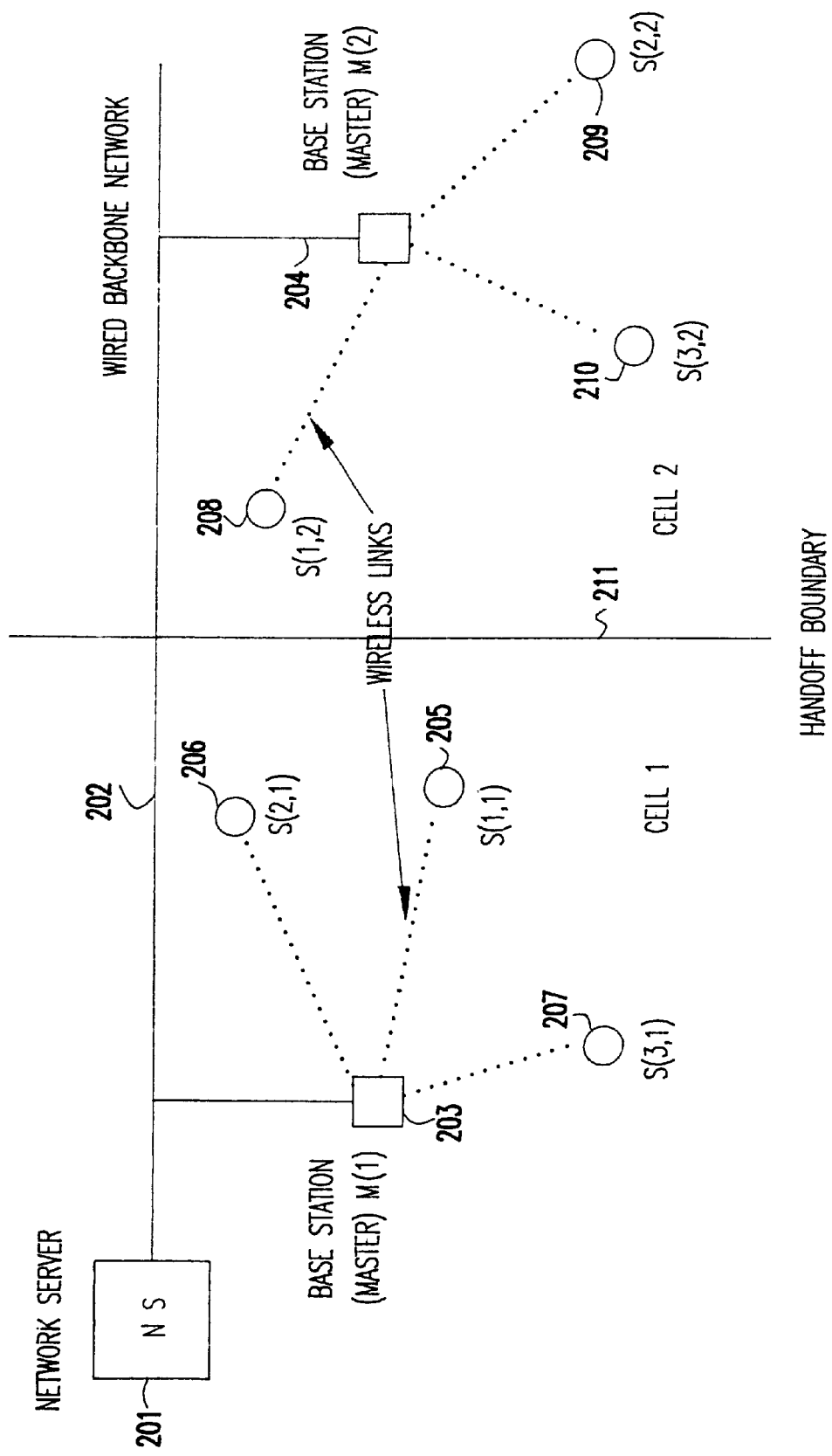
FIG. 2 is a block diagram of a wireless network with two cells illustrating the system on which the method of FIGS. 1A and 1B may be implemented.

Referring now to the drawings, and more particularly to FIGS. 1A and 1B, there is shown a flow chart of the method of maintaining communication continuity during handoff according to the present invention. With reference to this figure, the method is described here, without loss of generality, by considering two cells and their respective base stations and mobile units as shown in FIG. 2. The network consists of a Network Server (NS) 201 connected to a wired backbone network 202 to which multiple base stations 203 and 204, one for each cell, are connected. For simplicity in description, it is assumed that a base station is capable of supporting a maximum of three mobile units at a time. Thus, base station 203 is shown as supporting mobile units 205, 206 and 207, and base station 204 is shown as supporting mobile units 208, 209 and 210. Also, in conformity with standards, it is assumed that a master-slave relationship exists between a base station and a mobile unit. Generally, a master is the unit which coordinates communications within a cell, and slaves are units which are governed by the master for their data communication related activities. Thus, in each cell, the base station is the master which coordinates all the data communications within the cell. Further, it is assumed that each base station or mobile unit is capable of being a master or slave depending on the context and cell membership. Accordingly, a mobile unit can be a slave to multiple masters, or it can be a master to some slaves, itself being a slave to some master.

The system shown in FIG. 2 is illustrative, and it will be understood by those skilled in the art that an actual system may comprise many cells, each capable of supporting a plurality of mobile units. In FIG. 2, the master of cell "n" is denoted as M(n), and a slave mobile unit "m" in cell "n" is represented by the notation S(m,n). The handoff boundary 211 is shown here schematically as a straight line for simplicity in illustration, but in practice it can be of any arbitrary shape depending on topology and propagation characteristics of the environment. The Network Server (NS) 201 communicates with the slave mobiles through the appropriate base station. While a base station generally has some means of storing and forwarding data packets, in some simple networks it could just be a wireless communication node with minimal hardware. In such cases, a base station is also referred to as an Access Point. Again, for simplicity in illustration in the subsequent figures, NS 201 and the backbone network 202 are not shown, but it will be understood that NS 201 and backbone network 202 are part of the system illustrated for the various scenarios described.

Figure 3:
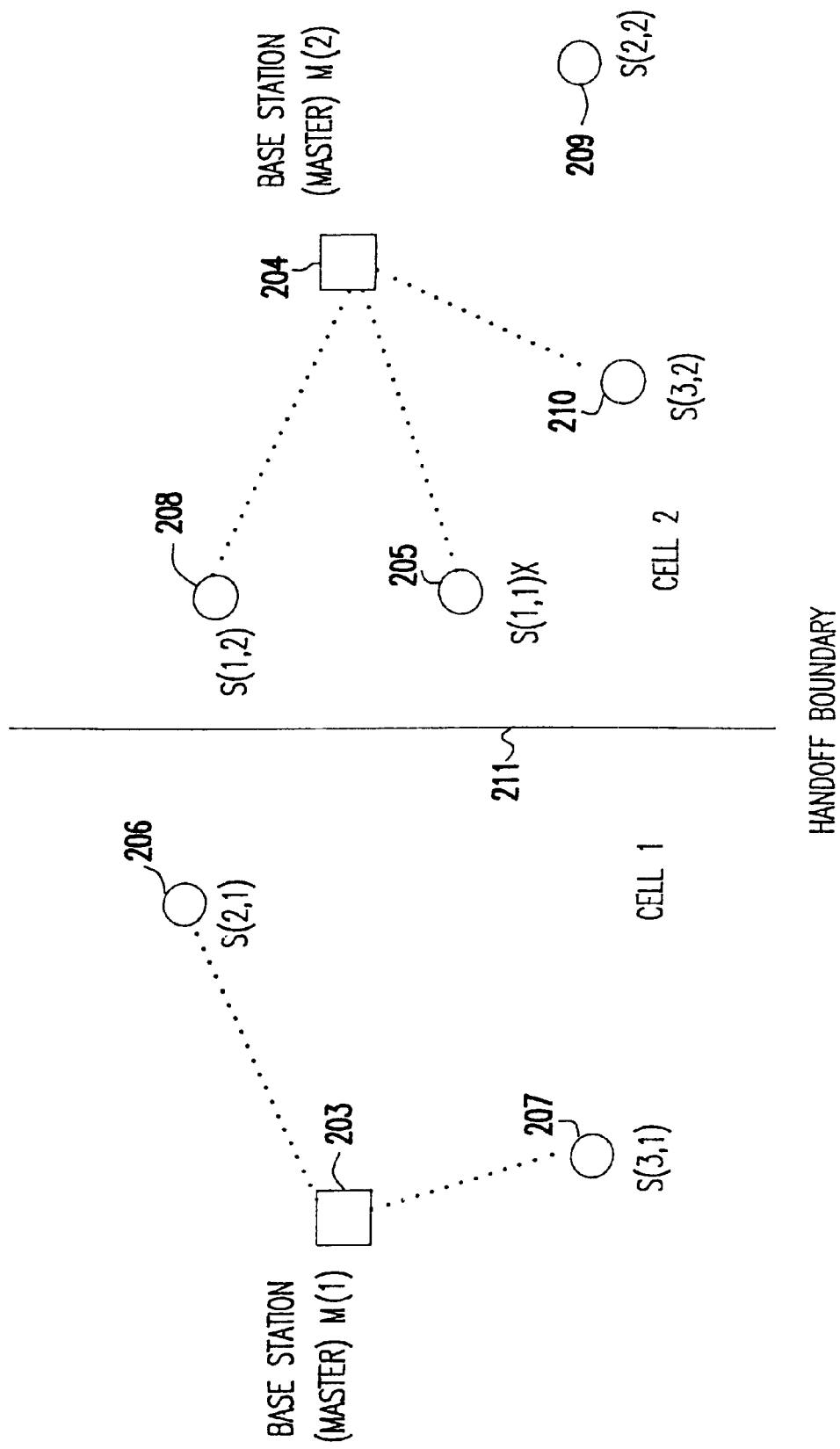
FIG. 3 is a block diagram of the wireless network of FIG. 2 illustrating the condition of a mobile unit in a busy cell.

Consider now a situation as shown in FIG. 3, wherein the slave mobile unit 205 S(1,1) has moved beyond the handoff boundary 211 to Cell 2. The notation S(1,1)X used in FIG. 3 indicates that the mobile unit was earlier a slave in Cell 1, but now is disconnected from the master unit 203 of that cell. The mobile unit 205 is now referred to as handoff mobile unit. With reference to FIG. 1, this is the beginning of the handoff process at 101. Upon entering Cell 2, handoff mobile unit 205 first determines if there is an available channel with the master unit of Cell 2 in decision block 102. If so, a wireless link is established with that master unit in function block 103, completing the handoff.

Now, in the situation illustrated in FIG. 3, the master unit 204 M(2) is busy with the maximum number of slave units; therefore, according to the present invention, handoff mobile unit 205 S(1,1)X assumes the role of an ad hoc master in function block 104 of FIG. 1 and, in function block 105, looks for any slave mobile units which can forward (relay) data packets to and from it until it can get a communication link with master unit 204 M(2). If no slave units respond, as determined in decision block 106, a check is again made in decision block 107 to determine if a channel has become available. If so, the process goes to function block 103; otherwise, the process loops back to function block 105 where slave mobile units are again paged. If now several slave units respond to the handoff mobile unit 205 S(1,1)X, it forms an ad hoc handoff Cell 3 (or picocell) with one or more slave units that have responded and itself as the master 205 M(3). The choice of slave units for data forwarding (relaying) in function block 108 can be based on criteria such as received signal strength indicator (RSSI), relative mobility, battery strength, etc. For instance, slave mobile units which have been mostly stationary during the immediate past and whose battery strength is high may be chosen. The handoff mobile unit 205 establishes wireless links with the chosen slave mobile units in function block 109 to establish an ad hoc handoff cell in function block 110. This process is completed in function block 111 by transmitting to the Network Server (NS) 201 a list of slave mobile units in the ad hoc handoff cell. At this point, the handoff mobile unit 205 can proceed with data communication through chosen slave mobile units in function block 112. During this time, the handoff mobile unit 205 continues to check for channel availability.

Figure 4:
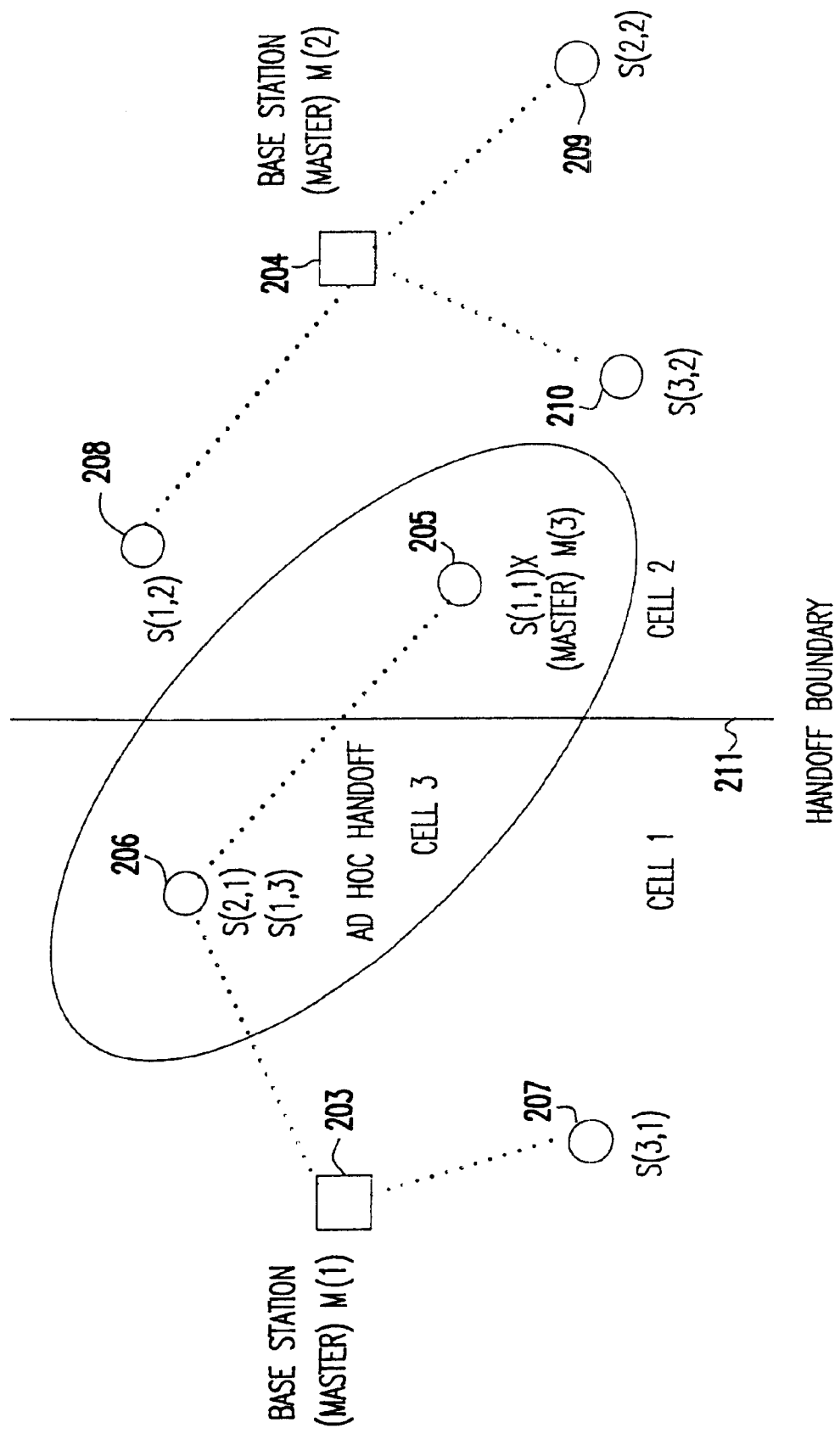
FIG. 4 is a block diagram of the wireless network of FIG. 2 illustrating an ad hoc handoff cell with a single neighboring slave mobile unit.

Suppose, for simplicity in description, it is assumed that handoff mobile unit 205 S(1,1)X chose slave mobile unit 206 S(2,1). Then, mobile unit 205 S(1,1)X forms an ad hoc handoff Cell 3 as shown in FIG. 4. In the ad hoc handoff Cell 3, handoff mobile unit 205 S(1,1)X is the master M(3), and the chosen mobile unit 206 S(2,1) is the only slave S(1,3) in this ad hoc handoff cell. Now, the slave mobile unit 206 S(2,1) (also S(1,3)) has two masters 203 M(1) and 205 M(3) with whom it can communicate by using appropriate access information such as time offset, access codes etc in a time division multiplexed manner. After thus establishing a link with an existing active slave mobile unit 206, the handoff mobile unit 205 S(1,1)X now sends information to the network server (NS) 201 to communicate with it through the slave mobile unit 206 S(1,3) in the ad hoc handoff Cell 3.

Figure 5:
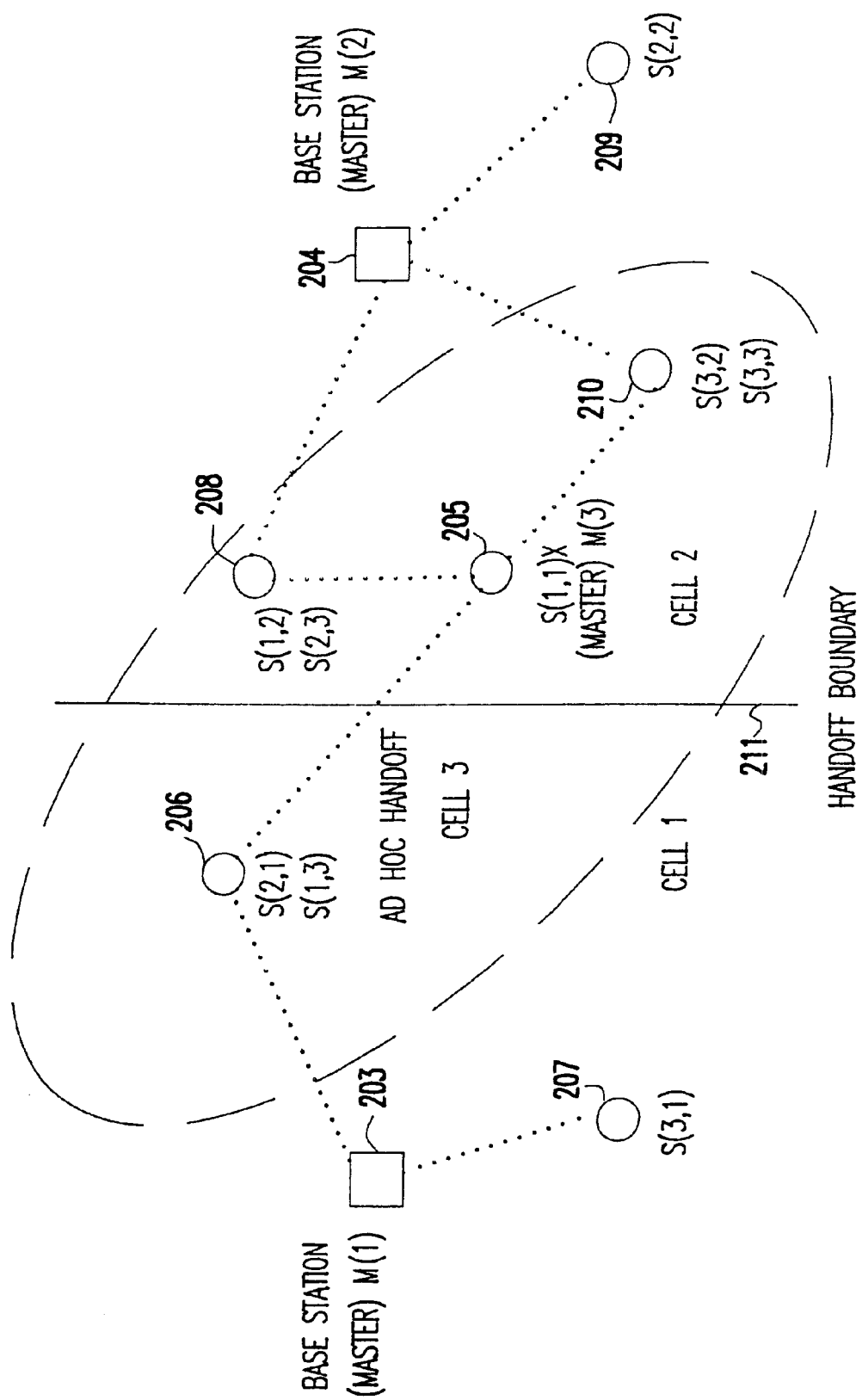
FIG. 5 is a block diagram of the wireless network of FIG. 2 illustrating an ad hoc handoff cell with three neighboring slave mobile units.

In case two or more slaves are included in the ad hoc handoff cell as shown in FIG. 5, then the handoff slave mobile unit 205 S(1,1)X (also master unit M(3)) can communicate with NS 201 through one or more of them. This provides a means of distributing the task of data packet forwarding among the participating slave mobile units. Also, with multiple slave mobile units in the ad hoc handoff cell, the resulting redundancy ensures greater chance of uninterrupted communication in spite of possible changes in relative positions of master unit 205 M(3) and the slave mobile units in Cell 3. In this case, the total data forwarding traffic can be distributed among slave mobile units in the ad hoc handoff cell based on relative activity/idleness of the slave mobile units.

The computation required for determining data forwarding task distribution can be carried out by the processor in the network server based on information received from slave mobiles in the ad hoc handoff cell. Alternatively, the data traffic distribution can be determined by the processor within the handoff mobile unit.

Figure 6:
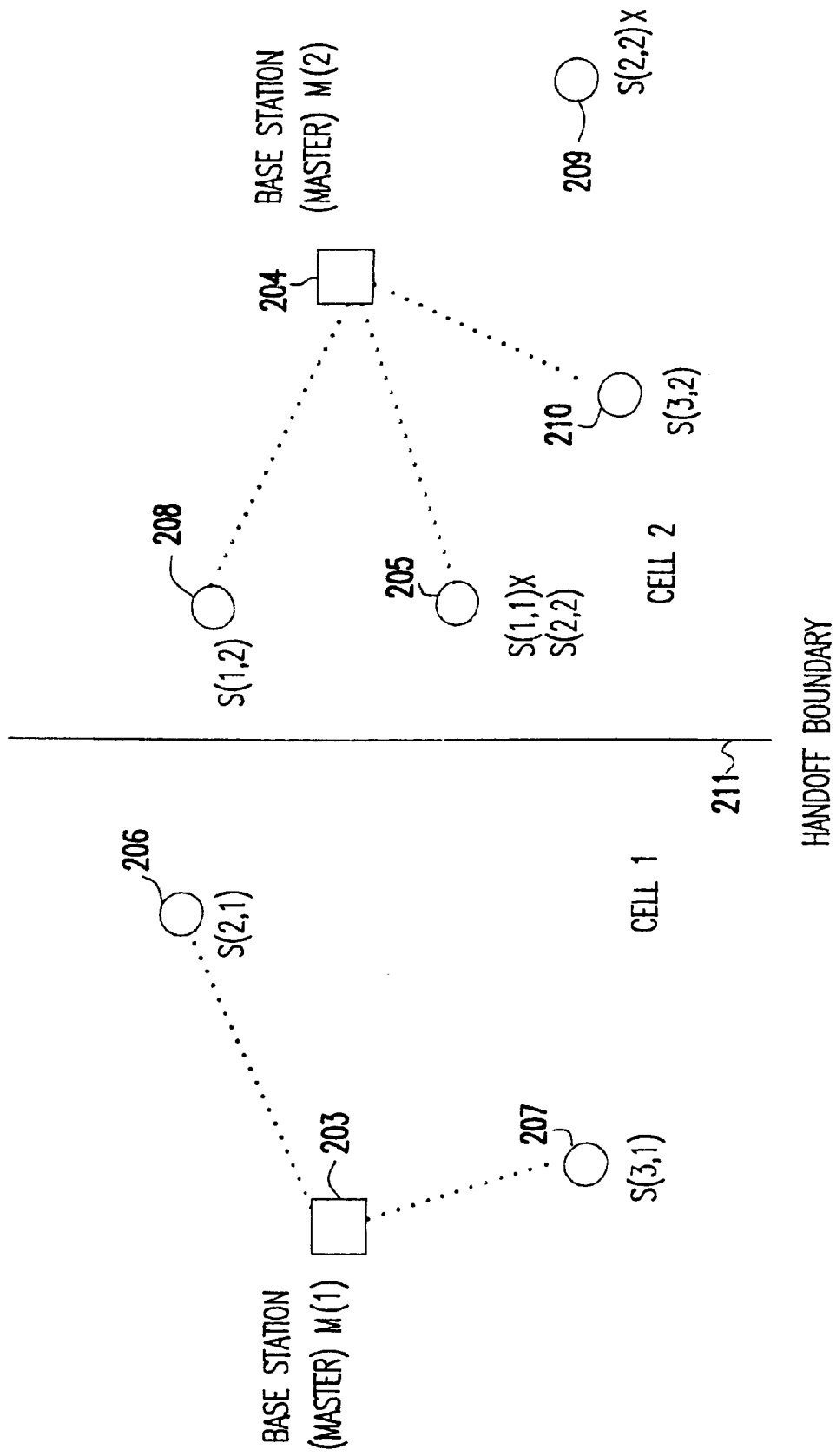
FIG. 6 is a block diagram of the wireless network of FIG. 2 illustrating handoff completion and dissolution of the handoff cell.

When the master unit 204 M(2) of target Cell 2 becomes free to receive handoff mobile unit 205 S(1,1)X possibly due to one of its slave units logging off or due to the scheduling strategy used by master unit 204 M(2), then master unit 205 M(3) becomes a slave mobile unit S(2,2) to master unit M(2) as shown in FIG. 6, and resumes communication with the NS 201 through master unit 204 M(2) as indicated in FIG. 1 at decision block 112 and function block 113. This completes the handoff of slave mobile unit 205 S(1,1) from master unit 203 M(1) to master unit 204 M(2). Now, the handoff Cell 3 is dissolved by master unit M(3) by sending appropriate control messages to the NS 201 and slave units in Cell 3 as indicated in function block 114 in FIG. 1.

While the above described method has been aimed at maintaining data communication for a handoff mobile unit which is waiting for a link with a busy master unit, as will be clear for those skilled in the art, the method can also be used to provide communication to a mobile unit which has moved out of an edge cell into a region which is not covered by any other master units. In this case, slave mobile units, if any, serve to extend the coverage area of the edge cell master unit.

The performance of the handoff method according to the invention has been evaluated through simulation of handoff scenario with linearly placed base stations, a handoff mobile unit and a data forwarding slave mobile unit. Some relevant simulation parameters are given in Table 1.

TABLE 1

Simulation Parameters

| Total transmission data size | 2 Mbytes |
| --- | --- |
| Data transfer speed | 28.8 Kbps |
| Handoff mobile speed | 1 m/s |
| Inter-packet arrival time | 2 ms |
| New link connection time (exponentially distributed) | Min: 0.1 s; Mean: 0.3 s; Max: 0.5 s |
| Route computing delay (exponentially distributed) | Min: 0.1 s; Mean: 1.0 s; Max: 2.0 s |
| Packet queuing delay (exponentially distributed) | Min: 1.0 s; Mean: 5.0 s; Max: 120 s |
| Packet size (exponentially distributed) | Min: 1 B; Mean: 150 B; Max: 1 KB |
| Distance between base stations (masters) | 8 m |
| Base station radio coverage | 5 m |
| Handoff region width | 2 m |
| Slave mobile radio access range | 2.5 m |

Figure 7:
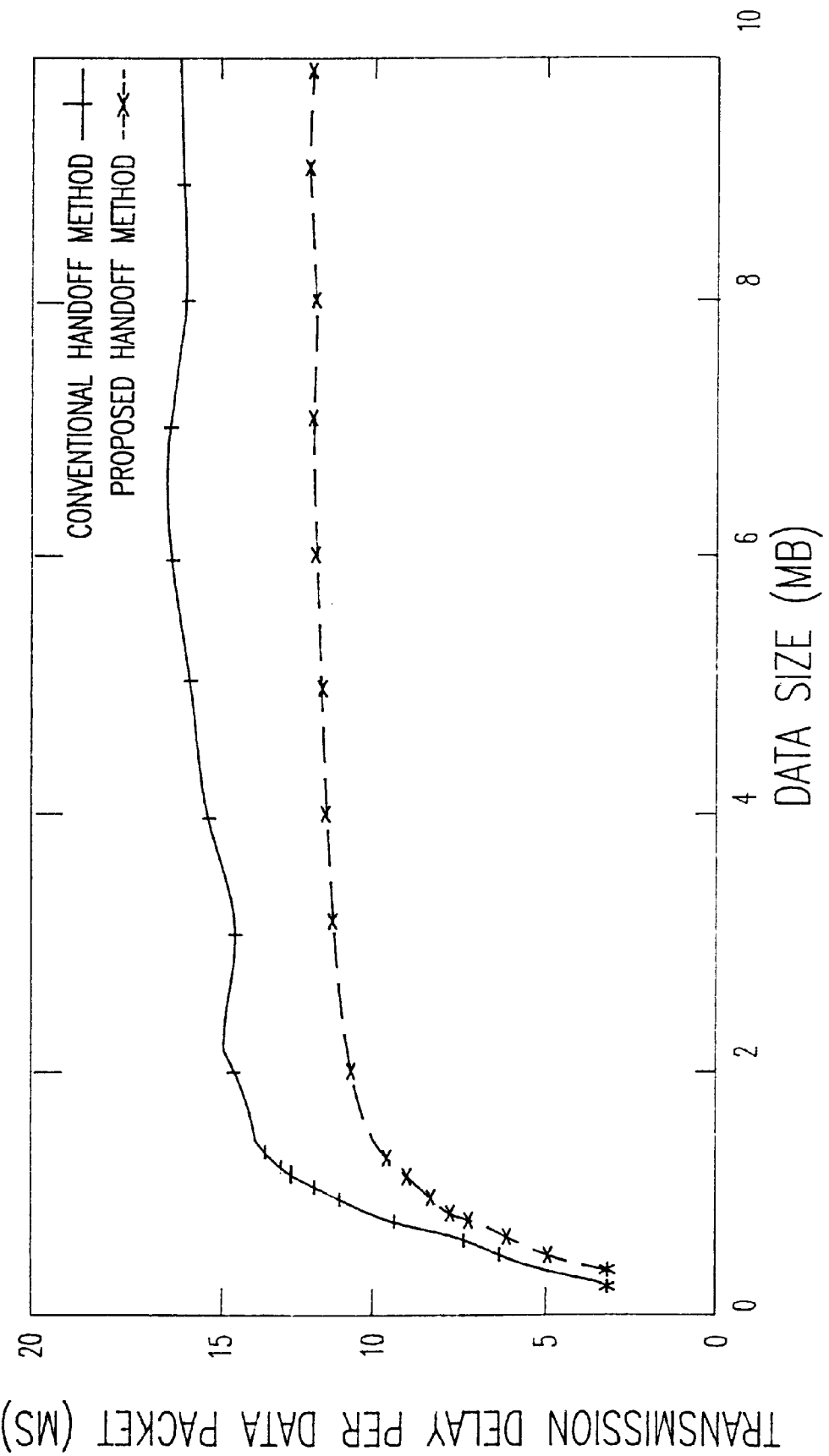
FIG. 7 is a graph of packet transmission delay versus data size showing the improvement in transmission delay of the handoff method according to the present invention over the conventional handoff method.
Figure 8:
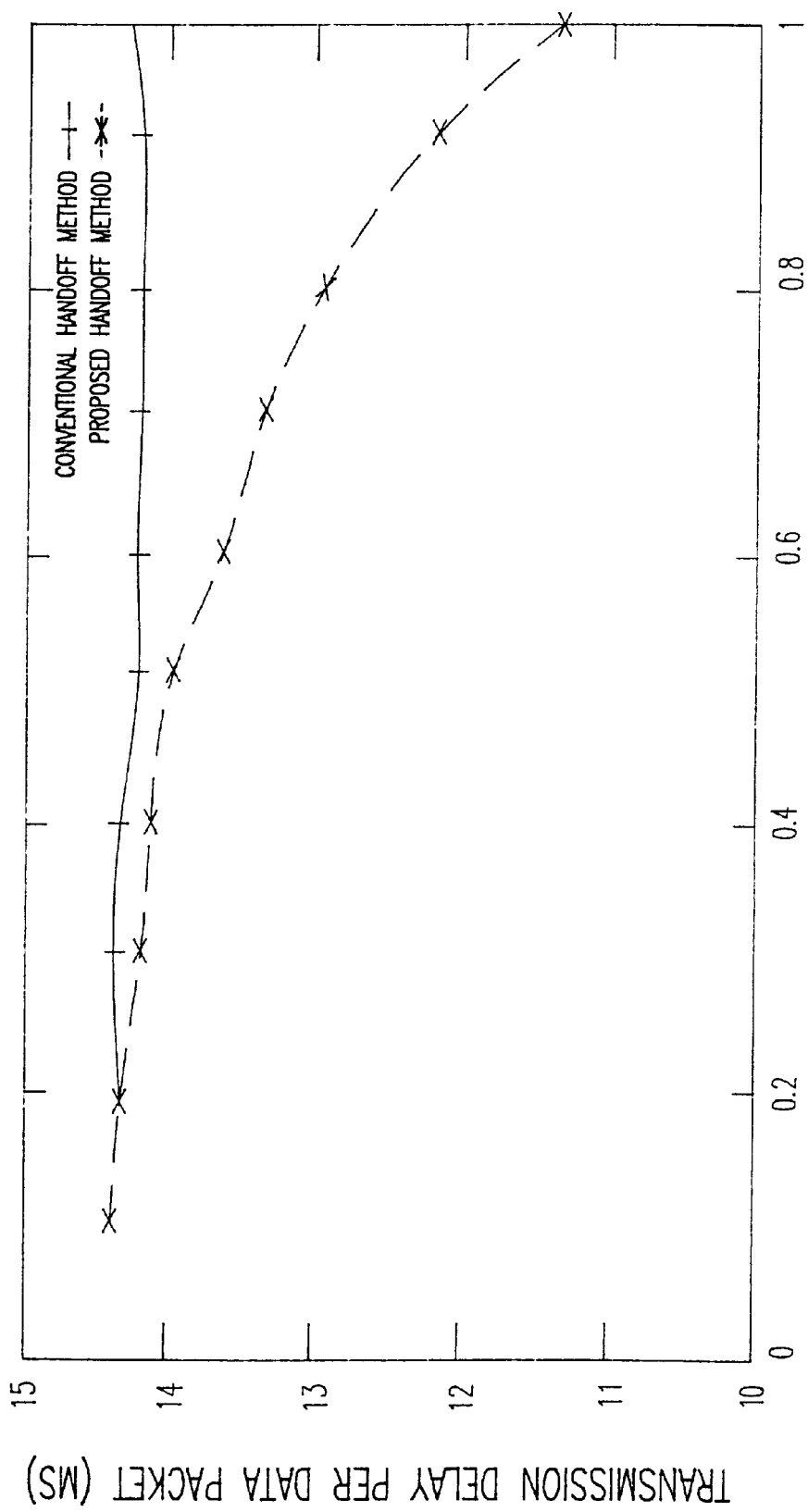
FIG. 8 is a graph of packet transmission delay versus slave mobile unit forwarding activity showing the improvement in transmission delay of the handoff method according to the present invention over the conventional handoff method.
Figure 9:
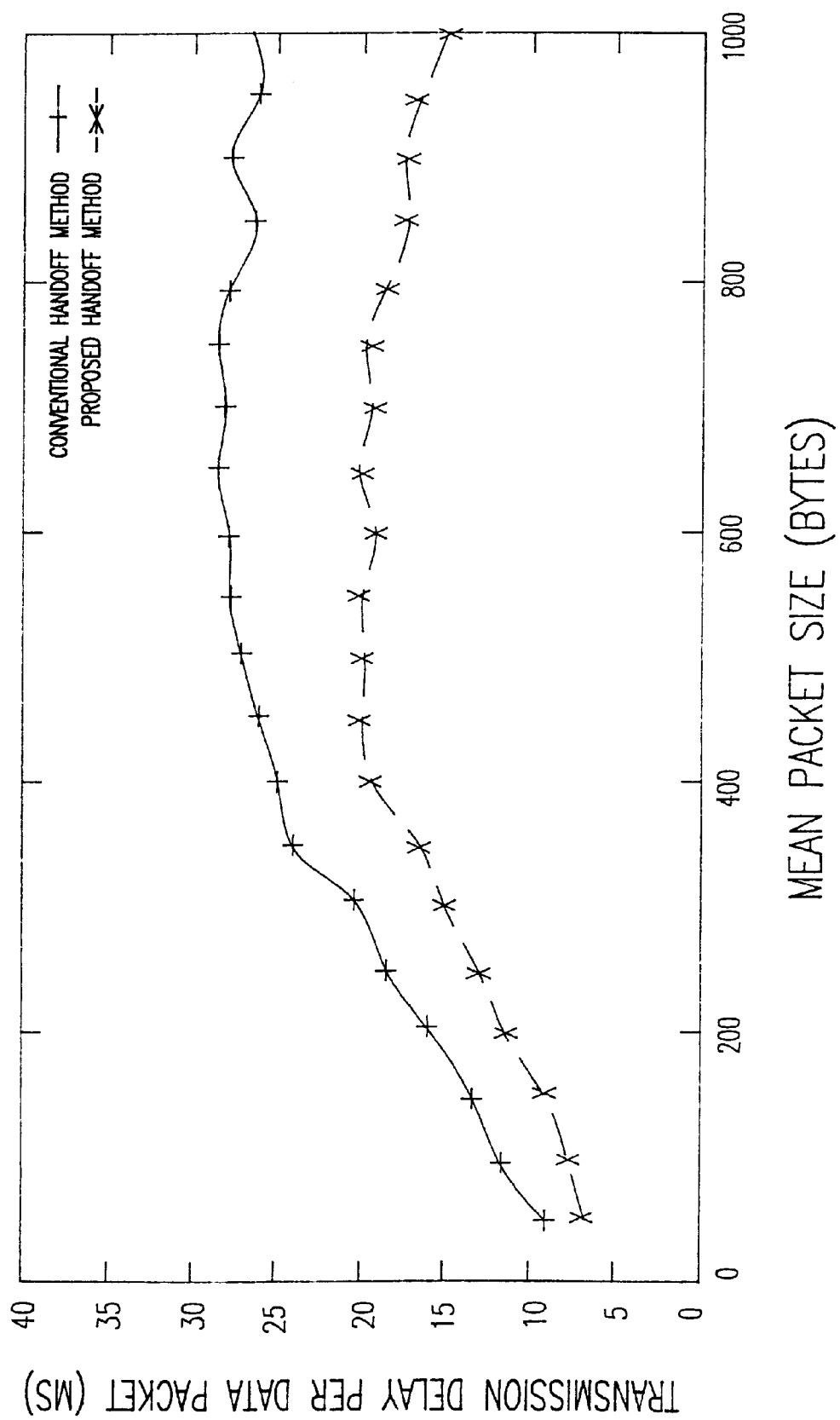
FIG. 9 is a graph of packet transmission delay versus mean packet size showing the improvement in transmission delay of the handoff method according to the present invention over the conventional handoff method.
Figure 10:
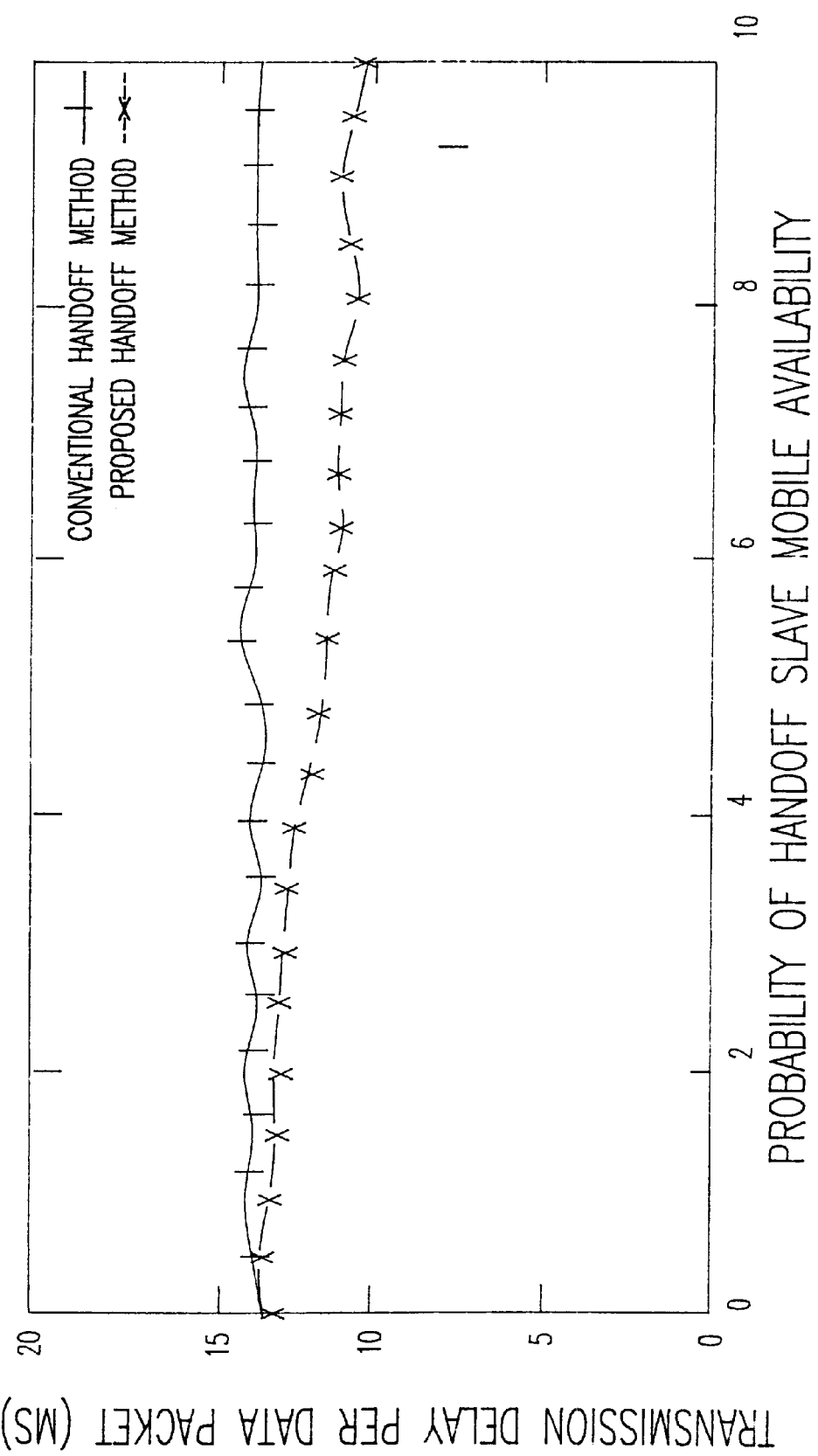
FIG. 10 is a graph of packet transmission delay versus slave mobile unit availability showing the improvement in transmission delay of the handoff method according to the present invention over the conventional handoff method.
Figure 11:
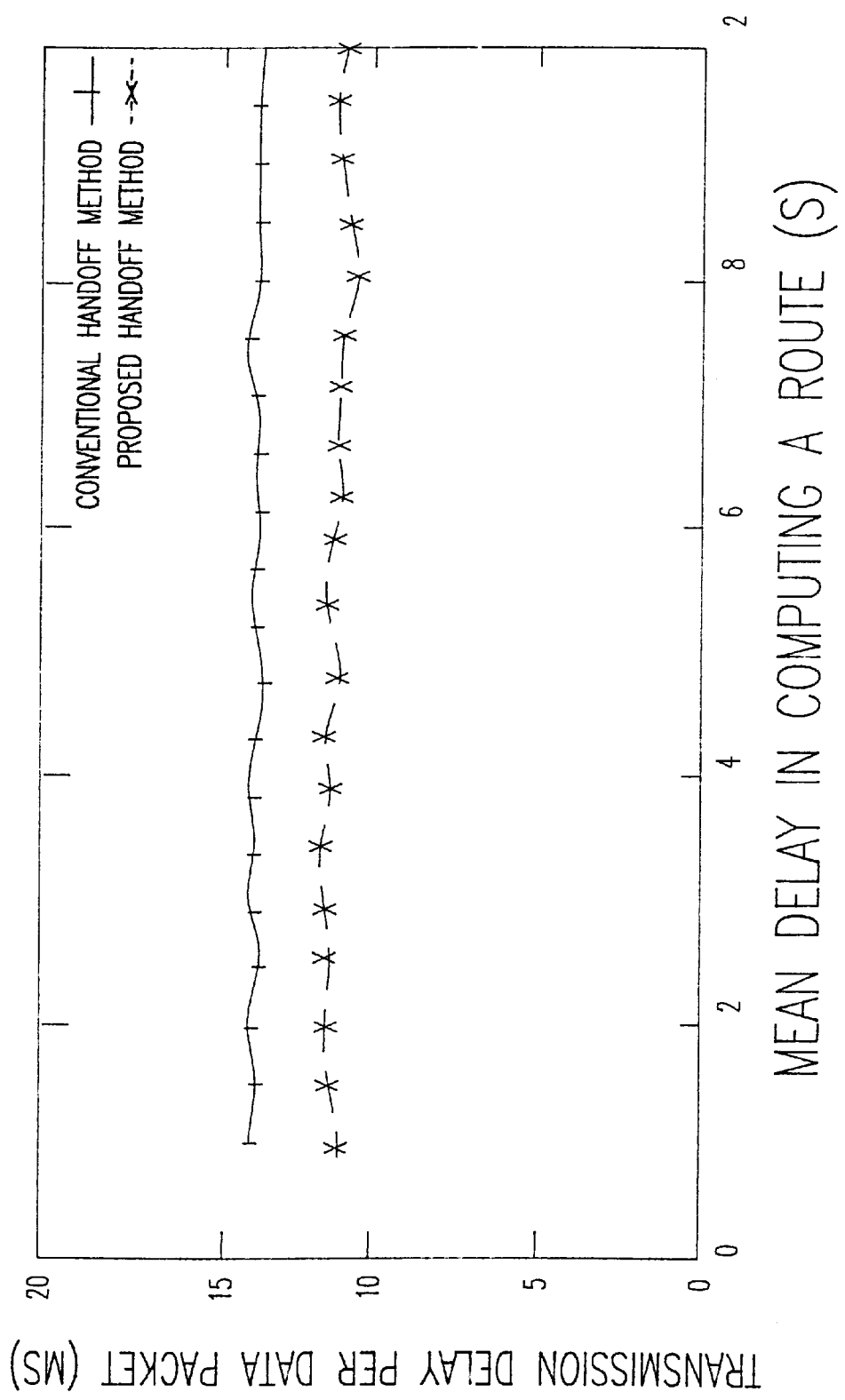
FIG. 11 is a graph of packet transmission delay versus route computing delay showing the improvement in transmission delay of the handoff method according to the present invention over the conventional handoff method.
Figure 12:
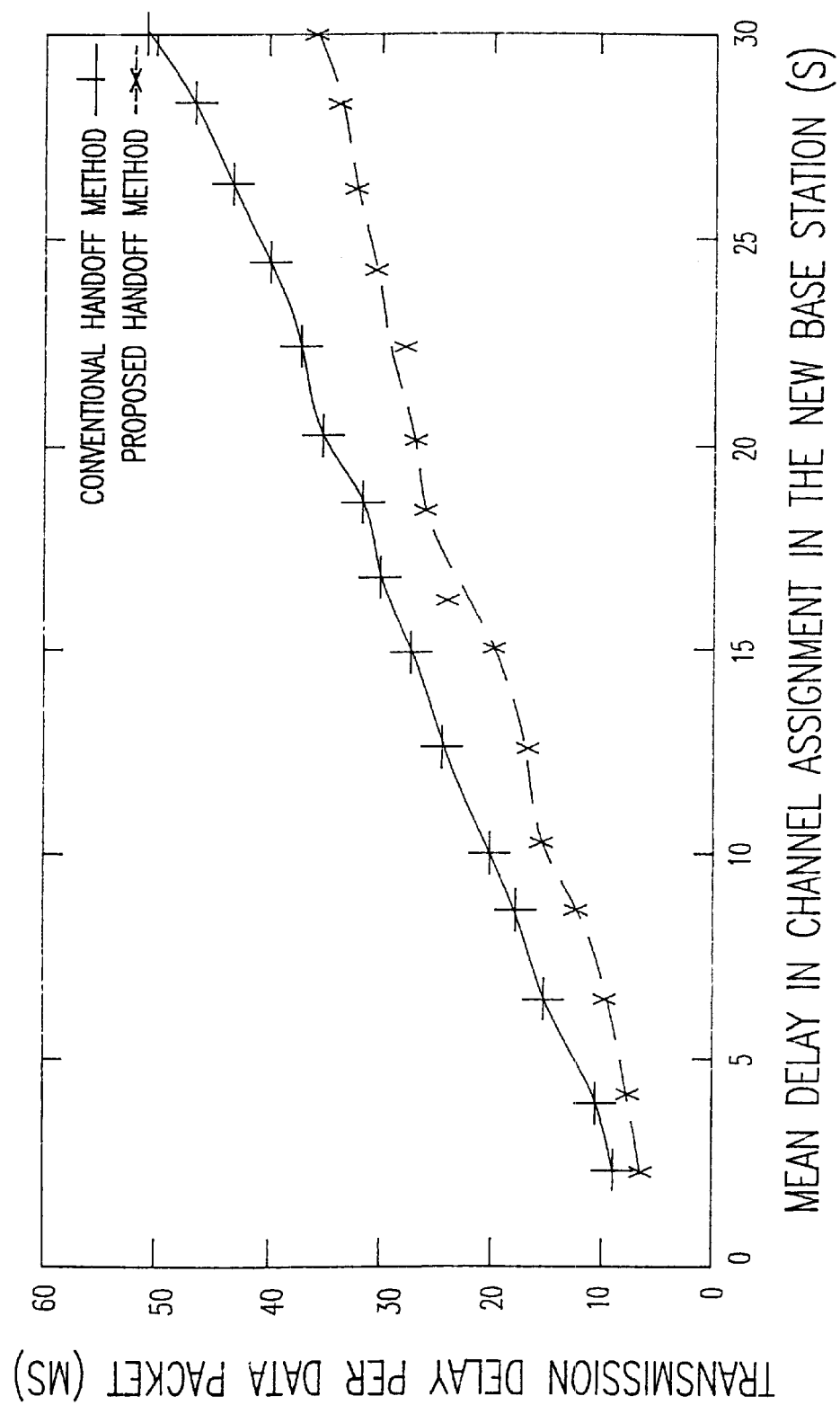
FIG. 12 is a graph of packet transmission delay versus channel assignment delay showing the improvement in transmission delay of the handoff method according to the present invention over the conventional handoff method.

The simulation results are shown in FIGS. 7 to 12. FIG. 7 is a graph of packet transmission delay versus data size. As shown by the plotted data, the transmission delay per data packet is reduced using the present invention. FIG. 8 shows a plot of packet transmission delay versus slave mobile data forwarding activity. In this figure, data forwarding activity of a handoff slave mobile is defined as the ratio of the time spent by the slave mobile unit in forwarding data packets to a handoff mobile unit to the total time for which it is active communicating with its master. The graph of FIG. 9 plots the data of packet transmission delay versus mean packet size. Again, the plotted data shows an improvement in transmission delay per data packet. FIGS. 10 and 11 show plots of packet transmission delay versus slave mobile unit availability and route computing delay, respectively. In FIG. 10, handoff slave mobile unit availability means that during the handoff period the slave mobile unit is free to perform data forwarding task for the handoff mobile. Route computing delay mentioned in FIG. 11 and Table 1 corresponds to the time taken in creating an ad hoc handoff cell (i.e., a picocell) and establishing the packet data forwarding path. Finally, FIG. 12 plots the data for packet transmission delay versus channel assignment delay. It is clear from FIGS. 7 to 12 that the method according to the invention reduces packet transmission delay for handoff mobile units as compared to the conventional handoff method wherein data forwarding through neighboring slave mobile units is not performed.

While the above described method is applicable to any general picocellular wireless networks that allow slave mobile units to communicate with two or more masters, its implementation in specific networks requires adoption of appropriate network-specific procedures. For example, in one application, a handoff slave mobile unit requires information about neighboring slave mobile units in order to establish an ad hoc handoff picocell. A handoff mobile unit can transmit inquiry messages in order to discover other slave mobile units that are active in its neighborhood. The slave mobile units that capture the inquiry messages may send a response to the handoff mobile unit. The slave mobile unit response contains information about the slave mobile unit and its current master unit. Based on this information, the handoff mobile unit can then establish links with the save units. As the inquiry procedure takes at least 5.12 seconds, an alternative and faster method involves providing information about all the active neighboring slave mobile units to every slave mobile unit in a regular picocell. The information consists of data such as the slave mobile unit's address, MAC (Medium Access Control) address, access code, clock offset, unit_hop sequence, etc. This information can be provided by the network server through the master of every picocell at periodic intervals of time. With this information, a handoff slave mobile unit can quickly establish a handoff picocell by a paging process. As will be clear to those skilled in the art, similar details of implementation need to be worked out during actual application of the described method to specific picocellular networks.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A method of maintaining packet data communication for a handoff mobile unit in wireless cellular networks when the handoff mobile unit enters a new cell which is already busy and unable to provide immediate connection for the handoff mobile unit comprising the step of initiating a creation of an ad hoc handoff cell by the handoff mobile unit paging slave mobile units in the vicinity of the handoff mobile unit, the handoff mobile unit becoming the master of the handoff cell when it is created.

2. The method of maintaining packet data communication for a handoff mobile unit in wireless cellular networks recited in claim 1, wherein one or more neighboring mobile units are capable of forwarding data packets between a network server and the handoff mobile unit.

3. The method of maintaining packet data communication for a handoff mobile unit in wireless cellular networks recited in claim 2, wherein the network server is intimated by the handoff mobile to continue further communication through one or more of the mobile units in the ad hoc handoff cell.

4. The method of maintaining packet data communication for a handoff mobile unit in wireless cellular networks recited in claim 2, wherein one or more mobile units in the ad hoc handoff cell forward data packets to and from the handoff mobile unit acting as the master of the ad hoc handoff cell while the handoff mobile unit is waiting for data connection with the master of a busy cell.

5. The method of maintaining packet data communication for a handoff mobile unit in wireless cellular networks recited in claim 4, wherein data forwarding is distributed among mobile units in the ad hoc handoff cell.

6. The method of maintaining packet data communication for a handoff mobile unit in wireless cellular networks recited in claim 5, wherein distribution of data forwarding is based on relative activity/idleness of the mobile units.

7. The method of maintaining packet data communication for a handoff mobile unit in wireless cellular networks recited in claim 5, wherein allocation of data forwarding load for mobile units is carried out in a processor present in the network server.

8. The method of maintaining packet data communication for a handoff mobile unit in wireless cellular networks recited in claim 5, wherein allocation of data forwarding load for mobile units is carried out in a processor present in the handoff mobile unit.

9. The method of maintaining packet data communication for a handoff mobile unit in wireless cellular networks recited in claim 5, wherein mobile units are chosen based on predetermined criteria.

10. The method of maintaining packet data communication for a handoff mobile unit in wireless networks recited in claim 9, wherein the predetermined criteria includes RSSI (Received Signal Strength Indicator), battery power level, relative mobility, or idleness of mobile units.

11. The method of maintaining packet data communication for a handoff mobile unit in wireless cellular networks recited in claim 4, wherein the mobile units within the ad hoc handoff cell communicate with their regular masters and the master of the handoff cell in a time division multiplexed manner.

12. The method of maintaining packet data communication for a handoff mobile unit in wireless cellular networks recited in claim 11, wherein mobile units have the capability to become masters for other slave units.

13. The method of maintaining packet data communication for a handoff mobile unit in wireless cellular networks recited in claim 12, wherein mobile units have the capability to be slaves to multiple master units.

14. The method of maintaining packet data communication for a handoff mobile unit in wireless cellular networks recited in claim 1, wherein the ad hoc handoff cell is dissolved by the handoff mobile unit after a communication link with the master of the target cell into which the mobile unit had moved is established.

15. The method of maintaining packet data communication for a handoff mobile unit in wireless cellular networks recited in claim 1, further comprising the function of extending a coverage range of an edge cell by utilizing mobile units, if any, in the edge cell to forward data packets to the handoff mobile unit which has moved out of the edge cell into a region which is not covered by any other master units.

16. A system for maintaining packet data communication for a handoff mobile unit in wireless cellular networks when the handoff mobile unit enters a new cell which is already busy and unable to provide immediate connection for the handoff mobile unit comprising:

a wireless cellular network including a plurality of base stations functioning as a master within a cell of the cellular network for a predetermined number of channels; and a plurality of mobile units functioning as slave units to a respective one of said base stations within a cell of the cellular network, said mobile units being capable of moving between cells of the cellular network and, when entering a cell as a handoff mobile unit for which cell all channels are currently occupied, of initiating creation of an ad hoc handoff cell by the handoff mobile unit paging slave mobile units in the vicinity of the handoff mobile unit, the handoff mobile unit becoming the master of the handoff cell when it is created.

17. The system for maintaining packet data communication for a handoff mobile unit in wireless cellular networks recited in claim 16, further comprising a network server connected to each of said base stations and wherein one or more neighboring mobile units are capable of forwarding data packets between the network server and the handoff mobile unit.

18. The system for maintaining packet data communication for a handoff mobile unit in wireless cellular networks recited in claim 17, wherein the network server is intimated by the handoff mobile to continue further communication through one or more of the mobile units in the ad hoc handoff cell.

19. The system for maintaining packet data communication for a handoff mobile unit in wireless cellular networks recited in claim 17, wherein one or more mobile units in the ad hoc handoff cell forward data packets to and from the handoff mobile unit acting as the master of the ad hoc handoff cell while the handoff mobile unit is waiting for data connection with the base station of a cell entered by the handoff mobile unit for which all channels are currently busy.

20. The system for maintaining packet data communication for a handoff mobile unit in wireless cellular networks recited in claim 19, wherein data forwarding is distributed among mobile units in the ad hoc handoff cell.

* * * * *